United States Patent [19]

Colak et al.

[11] Patent Number: 4,974,923
[45] Date of Patent: Dec. 4, 1990

[54] GAP TUNED OPTICAL WAVEGUIDE DEVICE

[75] Inventors: Sel B. Colak, Ossining, N.Y.; Richard A. Stolzenberger, Mahwah, N.J.; John J. Zola, Ramsey, N.J.

[73] Assignee: North American Philips Corporation, New York, N.Y.

[21] Appl. No.: 445,075

[22] Filed: Nov. 30, 1989

[51] Int. Cl.$^5$ .......................... G02B 6/10; G02B 6/26; H03F 7/00

[52] U.S. Cl. ................ 350/96.12; 350/96.11; 350/96.15; 350/96.30; 307/425; 307/427; 307/430

[58] Field of Search ............... 350/96.10, 96.11, 96.12, 350/96.13, 96.14, 96.15, 96.30, 96.34, 311, 353; 307/425, 426, 427, 428, 429, 430

[56] References Cited

U.S. PATENT DOCUMENTS

| | | | |
|---|---|---|---|
| 3,822,927 | 7/1974 | Zernike | 350/96.12 X |
| 3,832,567 | 8/1974 | Jacques | 307/427 X |
| 4,360,247 | 11/1982 | Beasley | 350/96.15 |
| 4,427,260 | 1/1984 | Puech et al. | 307/427 X |
| 4,453,802 | 6/1984 | Bridges et al. | 350/96.15 |
| 4,717,230 | 1/1988 | Levinson | 350/96.15 |
| 4,852,961 | 8/1989 | Yamamoto et al. | 350/96.12 X |
| 4,859,876 | 8/1989 | Dirk et al. | 307/425 |
| 4,865,406 | 9/1989 | Khanarian et al. | 350/96.12 |
| 4,867,510 | 9/1989 | Dobson | 350/96.12 X |
| 4,896,933 | 1/1990 | Yano et al. | 350/96.15 |

Primary Examiner—Brian Healy
Attorney, Agent, or Firm—Robert J. Kraus

[57] ABSTRACT

An active waveguide device is provided for doubling the frequency of an applied light wave. The device includes first and second optical waveguides which are coupled through a separating gap. The coupling can be precisely adjusted to maximize the doubling efficiency by adjusting the gap dimension. The device is particularly suitable for producing higher frequency blue radiation from lower frequency infrared radiation which is readily produced by semiconductor lasers.

10 Claims, 3 Drawing Sheets

GAP TUNED OPTICAL WAVEGUIDE DEVICE

BACKGROUND OF THE INVENTION

1. Field of the Invention

This invention relates to nonlinear optical devices and more particularly to devices for doubling the frequency of electromagnetic radiation propagating therethrough.

2. Description of Related Art

Optical digital data storage devices, such as compact discs, are now commonly used for many purposes, such as for the storage of digitized video, audio and computer data. Typically the data is written onto and read from such discs by means of a light emitted by a semiconductor laser diode. The light generated by available semiconductor laser diodes generally falls within the lower end of the electromagnetic frequency spectrum (i.e. red or infrared). The use of higher frequency light (i.e. at the blue end of the spectrum) to read and write the optically stored data would result in greatly increased storage density.

Unfortunately, practical higher frequency semiconductor lasers are not available. The only blue light producing lasers are large gas lasers which are unsuitable for use in compact and inexpensive optical storage read/write devices.

One way of compactly producing blue light would be to convert the infrared light emitted by readily available semiconductor laser diodes to blue light. The frequency of blue radiation is twice that of infrared radiation. Thus, a device capable of doubling the frequency of infrared radiation has considerable commercial potential.

A number of nonlinear optical devices capable of performing frequency doubling are known. Typically these doubling devices include bulk materials or stacks of nonlinear crystals configured to perform frequency doubling by second harmonic generation of a fundamental frequency.

A particularly effective doubling device is a nonlinear optical waveguide. As a fundamental frequency light wave propagates through the waveguide, the nonlinear optical effect causes the generation of the second harmonic frequency light wave. Such optical waveguides can efficiently effect frequency doubling only if the fundamental and doubled waves remain substantially in matched phase with each other as they propagate through respective portions of the waveguide. If the two waves do not remain in phase, interference effects will cause attenuation of the second harmonic.

It is very difficult to produce waveguide doublers having the precision dimensional and physical properties required for accurate phase matching. Further, waveguide doublers with fixed properties are incapable of responding to changing ambient conditions which would affect the efficiency of operation. For example, changes in temperature will affect the refractive indices of the materials used in the doublers. It is therefore desirable to provide a waveguide doubler which can be actively "tuned" to allow for manufacturing tolerances and changes in ambient conditions.

Proposals for active phase matching of waveguides have been made in, for example, U.S. Pat. No. 4,427,260 to Puech et al, which issued on 24 Jan. 1984, and in the article "Electric Field Tuning of Second-Harmonic Generation in a Three-Dimensional LiNbO$_3$ Optical Waveguide", *Applied Physics Letters*, 34(1), 1 Jan. 1979.

These proposals aim to achieve phase matching by electro-optically tuning the materials forming the waveguides. However, the proposed electro-optical tuning approaches will achieve only relatively small changes in the indices of refraction of the waveguides and, consequently, will achieve only relatively small changes in phase matching.

SUMMARY OF THE INVENTION

It is an object of the invention to provide an optical waveguide device capable of actively phase matching fundamental and internally generated harmonic light waves over a wide range of dimensional and physical variations.

In accordance with the invention, an optical waveguide device is provided for converting light energy of a predetermined fundamental frequency received at an input end of the device to light energy of a respective harmonic frequency which is emitted at an output end of the device. The device includes first and second waveguides, each comprising a material which is capable of transmitting light energy of the fundamental and harmonic frequencies. At least one of the waveguides comprises a nonlinear material with which light energy of the fundamental frequency will interact to effect the generation of light energy of the harmonic frequency.

In order to enable active phase matching of the fundamental and harmonic frequency light energy, the first and second waveguides are arranged relative to each other such that surfaces of the light transmitting materials therein define therebetween a coupling gap having a predetermined nominal dimension. This nominal dimension is chosen to obtain an effective index of refraction of the device which will result in maximum conversion efficiency if the device has been precisely manufactured to optimum mechanical and physical specifications and is operating at predefined environmental conditions. Because such precise construction and such predefined operating conditions generally do not occur, a surface is provided on at least one of the waveguides to enable the application of a force for adjusting the gap dimension. By adjusting the gap dimension, the effective index of refraction of the device can be actively adjusted to obtain maximum conversion efficiency despite deviations from the optimum specifications and predefined operating conditions.

In one preferred form of the invention, the gap is defined by surfaces of opposing layers of the light transmitting material and one of these layers has a width approximating that of a beam of light energy which will be applied to the input end of the device for conversion. By limiting the width of the layer in this manner, the beam width is constrained as it propagates through the device to the output end. This facilitates, or even avoids the need for, focusing the harmonic frequency light radiation leaving the output end of the device.

DESCRIPTION OF THE PREFERRED EMBODIMENTS

Figure 1:
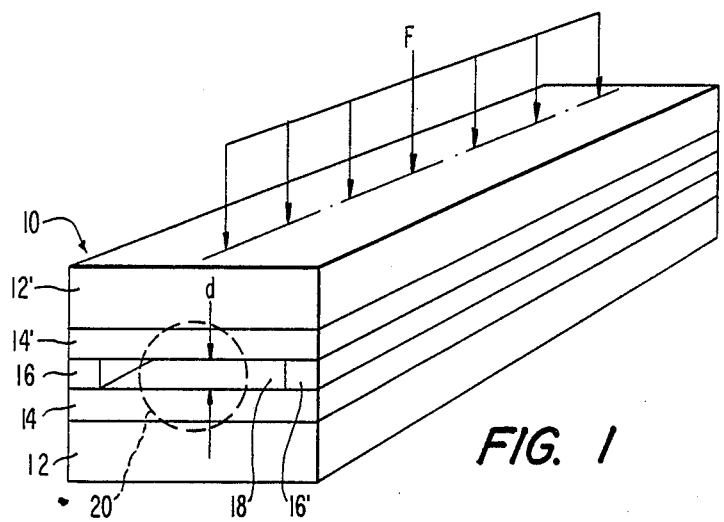
FIG. 1 is a perspective view of a first embodiment of a waveguide device in accordance with the invention.

FIG. 1 illustrates (not to scale) an adjustable gap optical waveguide device 10 for converting light energy of a fundamental frequency to light energy of a respective harmonic frequency. For the particular materials and dimensions described, the device will operate efficiently to double the frequency of an infrared light beam having a wavelength in the approximate range of 800 to 850 nanometers. Thus, the device will efficiently convert infrared radiation to blue radiation.

Device 10 is formed of adjoining first and second optical waveguides. The first waveguide includes a substrate 12 of a single crystal material having a lower refractive index on which is formed, such as by a diffusion technique, a layer 14 of a single crystal material haVing a higher refractive index. In this exemplary embodiment, substrate 12 comprises potassium titanate phosphate (KTiOPO$_4$), which will be hereinafter referred to as "KTP". This substrate has a refractive index at infrared wavelengths of about 1.75 and a thickness which is typically from 200 microns to 1 mm. This thickness is not critical and is primarily a function of the structural strength desired. Layer 14 comprises KTP into which thallium has been incorporated by a method such as diffusion to form the material K$_x$Tl$_{1-x}$TiOPO$_4$. This layer has a peak refractive index at infrared wavelengths of about 1.95 and a thickness of 1 to 5 microns. The thickness chosen is a function of the wavelength of the fundamental wave.

The second substrate comprises a substrate 12' and a deposited layer 14' which are substantially identical to substrate 12 and layer 14, respectively. The first and second substrates are spaced apart by means of spacers 16, 16', such that outer surfaces of the layers 14, 14' face each other across a gap 18. For reasons which will be described subsequently, the spacers are of either a rigid material or of a relatively flexible material which does not chemically react with the surfaces of the layers. Examples of suitable rigid materials are gold, silver, glass or copper. The waveguides are held against each other by external force applying means such as is subsequently described with reference to FIG. 5.

The gap 18 may be open to the atmosphere to simplify construction of the device. Alternatively, the gap may be enclosed and evacuated or filled with a different fluid such as an inert gas, or may be filled with a compressible solid material. To maximize the frequency conversion efficiency of the device, whatever is contained in the gap should preferably have a refractive index which is smaller than that of the layers 14, 14'. This will promote propagation of the light wave in these harmonic frequency generating layers. For the same reason, the substrates 12, 12' should also have refractive indices which are lower than the respective layers 14,14' which they support.

Only one of the layers 14, 14' or one of the substrates 12, 12' need be of nonlinear polarizing material, which will interact with a fundamental frequency light wave propagating therein to produce harmonic frequency light waves. However, to effect maximum conversion efficiency, both of the layers and both of the substrates are of such nonlinear polarizing materials.

Light energy propagating in the waveguide device tends to concentrate in the layers 14, 14' because the materials chosen for these layers have the highest refractive indices. The thicknesses of these layers are chosen to facilitate propagation and phase matching of the desired wavelengths and also to determine the mode of propagation.

The effective index of refraction of the waveguide device is a function of both the combined thickness of the waveguide layers and the wavelength of the light energy propagating through the device. For the particular wavelengths of interest, the effective index can be varied by varying the gap dimension d. This can be done, for example, by applying a variable force to one of the substrates. In the embodiment illustrated in FIG. 1, substrate 12 is supported on a rigid surface (not shown) and the force is applied along a centerline of an outer surface of substrate 12'. If the spacers 16, 16' are of a rigid material the applied force causes a slight downward bowing (not shown) of the substrate 12' and layer 14' and a consequent change in the gap dimension d. Such bowing is relatively small in comparison to the width of the substrate and will not adversely affect the operation of the device. If desired, however, the opposing surfaces of layers 14 and 14' can be made to remain substantially parallel to each other by utilizing a compressible material for the spacers and by making substrate 12' sufficiently thick to be inflexible.

Figure 2:
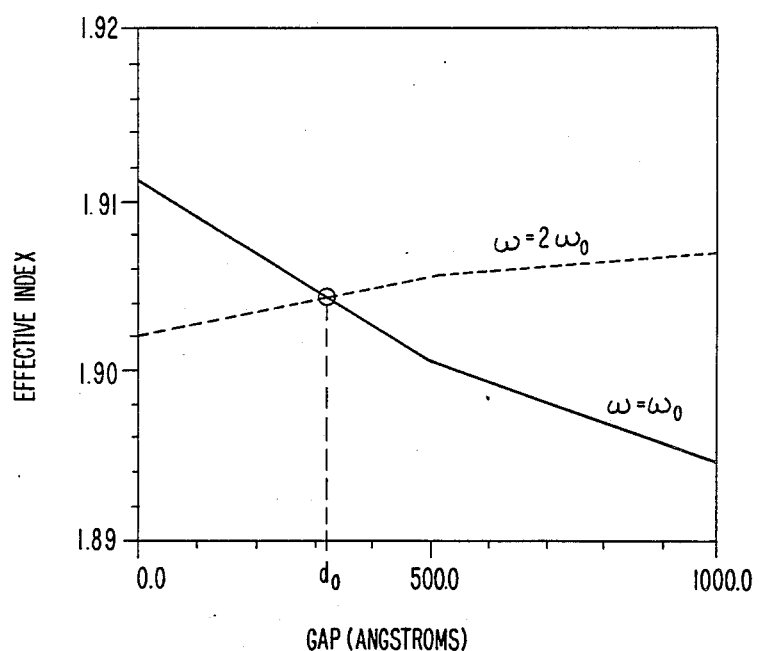
FIG. 2 is a graph illustrating variation of the effective refractive index of the waveguide device of FIG. 1 with variation of the gap dimension.

FIG. 2 illustrates curves representing the calculated variation of the effective index of refraction with the gap dimension d for the device 10 with the gap 18 filled with air. As the gap dimension increases from zero, the effective index for the fundamental frequency infrared radiation wave ($\omega = \omega_o$) decreases while the effective index for the second harmonic blue radiation wave ($\omega = 2\omega_o$) increases. There is one gap dimension d$_o$ at the intersection of the two curves where the effective index is the same for both the fundamental and the second harmonic waves. It is at this gap dimension where the two waves will propagate in phase through the waveguide device. The place where the two curves intersect, and thus the precise value of the dimension d$_o$, is dependent on the exact thicknesses and physical properties of the materials forming the device 10. The place of intersection is also somewhat dependent on temperature changes of the materials, especially with respect to fluid materials which may be used in the gap. In accordance with the invention, the gap dimension d$_o$ can be adjusted to the precise value at which the intersection occurs by adjusting the force applied to press the two waveguides together.

Figure 3:
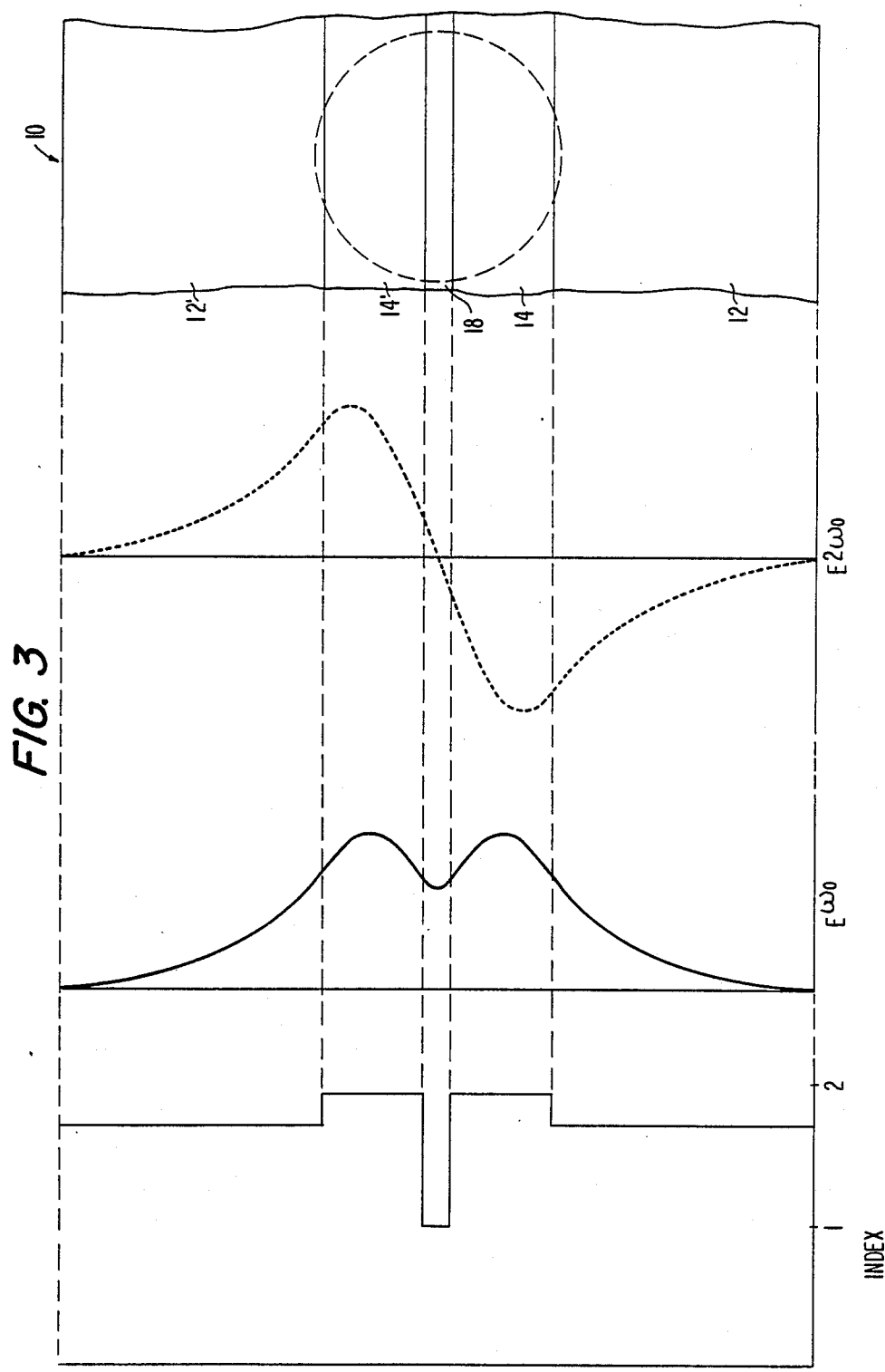
FIG. 3 is a graph illustrating propagation characteristics of the waveguide device of FIG. 1.

FIG. 3 illustrates the operation of the device when a beam of light radiation is applied to an input end at the location defined by the dashed circle 20. Typically the beam will be produced by a semiconductor laser, such as a gallium arsenide laser for producing infrared radiation, and either focused onto the input end or applied to the input end by means of an optical fiber.

The principal radiation of interest for second harmonic generation in a waveguide device of KTP material propagates in a combination of the TE$_o$ and TM$_o$ modes. This may be different for other materials and guides. Normalized curves at the center of FIG. 3 represent for these modes the electric field intensities of the fundamental frequency radiation (E$^{107 o}$) and the second harmonic frequency radiation (E$^{2\omega o}$) propagating through the device. At opposite ends of the figure are illustrated a central section of the device 10 and a sketch of the approximate indices of refraction of respective materials in the device. As can be seen from the figure, the fundamental frequency radiation is concentrated near the airgap 18 and the layers 14, 14', while the second harmonic frequency radiation is concentrated in the nonlinear layers 14, 14', where second harmonic generation occurs.

Figure 4:
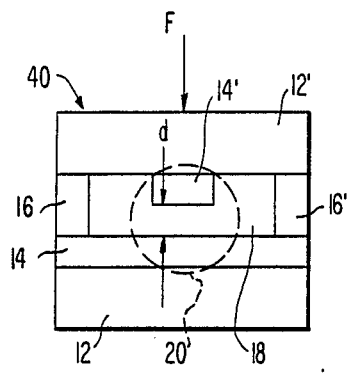
FIG. 4 is a perspective view of a second embodiment of a waveguide device in accordance with the invention.

Although it is not shown in FIG. 1, the light beam applied to the input end of the device 10 at the location 20 tends to widen as it propagates through the device. In applications where such beam widening is undesirable, the embodiment of FIG. 4 can be employed. FIG. 4 illustrates an embodiment of a waveguide device 40 which is substantially identical to the device 10 except for the configurations of layer 14' and spacers 16, 16'. In device 40, the width of layer 14' is narrowed to approximate the width of the light radiation applied at the location 20. By merely narrowing the layer 14', the beam is constrained to substantially the area defined by the dashed circle 20 as the beam propagates through the device. To retain the same gap dimension d, the thickness of the spacers 16, 16' is increased to extend to the layer 12'.

Figure 5:
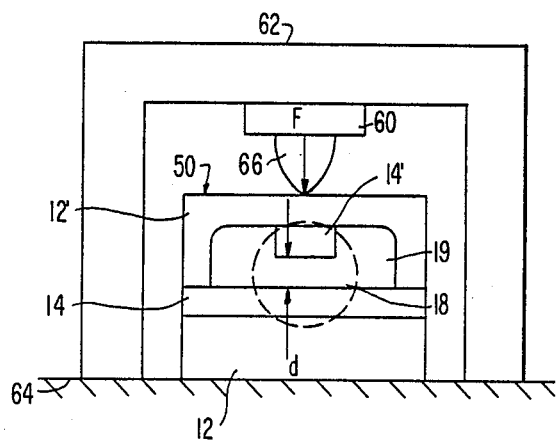
FIG. 5 is a perspective view of a third embodiment of a waveguide device in accordance with the invention.

FIG. 5 illustrates both a third embodiment 50 of a waveguide device in accordance with the invention and exemplary means for adjusting the gap dimension d. Device 50 is substantially identical to device 40, except for the elimination of the spacers 16, 16' and the substitution therefor of integral sidewall extensions of the substrate 12'. These sidewall extensions are formed by etching a channel 19 in the substrate which is sufficiently deep to provide for both the thickness of the layer 14' and the gap dimension d. This configuration of the substrate 12' not only simplifies the construction of the waveguide device, but also facilitates joining of the first and second waveguides. Because the substrate 12' and the layer 14 are of substantially the same materials, they can be bonded together in a clean environment at the two surfaces where they touch by Van der Waals force.

The gap dimension changing force F is applied to the waveguide device by means of a piezoelectric translator 60 which is disposed in a housing 62 affixed to a rigid surface 64 on which the device 50 is supported. The piezoelectric translator 60 applies the force F to a longitudinal centerline of the substrate 12' through a longitudinally extending rigid bar 66. The force can be adjusted electrically by varying a control voltage applied to the translator.

Although the invention has been described with reference to particular embodiments, these are exemplary only and many possible variations are within the scope of the invention. For example, the gap dimension changing force could be produced by covering the outer surfaces of the waveguides with respective conductive layers serving as the plates of a capacitor. By adjusting the magnitudes of opposite polarity charges on the plates, the attractive forces between the plates could be correspondingly adjusted.

Also, the layers 14,14' can be of other materials than those described, such as zinc sulfide evaporated onto the substrates 12, 12', respectively. Depending on the materials chosen for the substrates and the layers, different modes would be utilized.

In addition, gap tuning can be used for phase matching in nonlinear interaction (or mixing) of three or more guide modes all having different frequencies.

We claim:

1. An optical waveguide device for converting light energy of a predetermined fundamental frequency received at an input end of the device to light energy of a respective harmonic frequency emitted at an output end of the device, said device including:
   a. a first optical waveguide comprising a nonlinear material which is capable of transmitting light energy of said fundamental and harmonic frequencies;
   b. a second optical waveguide comprising a material which is capable of transmitting light energy of said fundamental and harmonic frequencies;
   said first and second waveguides being arranged relative to each other such that surfaces of the light transmitting material thereof define therebetween a coupling gap having a predetermined nominal dimension; and
   at least one of said waveguides having a surface provided for the application of a force for adjusting the gap dimension, thereby adjusting the effective index of refraction of the device.

2. A device as in claim 1 where the first and second waveguides comprise first and second substrates supporting respective first and second layers of material transmissive to light energy of said fundamental and harmonic frequencies.

3. A device as in claim 1 or 2 where at least one of said first and second layers comprises a nonlinear material for converting light energy of the fundamental frequency received at the input end of the device to light energy of the second harmonic frequency.

4. A device as in claim 1 or 2 where each of said first and second layers has an index of refraction which is larger than that of the respective supporting substrate.

5. A device as in claim 1 or 2 where the gap contains a fluid which is capable of transmitting light energy of said fundamental and harmonic frequencies.

6. A device as in claim 1 or 2 where the gap contains a compressible solid which is capable of transmitting light energy of said fundamental and harmonic frequencies.

7. A device as in claim 2 where each of the first and second layers has a predefined width extending transversely to a direction in which the light energy is transmitted through said layers, the width of at least one of said layers approximating a predefined width of a light beam to be applied to the input end of said device.

8. A device as in claim 1 or 2 where the gap is formed by means of spacing members separating the first and second waveguides.

9. A device as in claim 1 or 2 where the gap is formed by means of a channel formed in at least one of the first and second waveguides.

10. A device as in claim 1 or 2 where the fundamental frequency is in the infrared light spectrum and where the harmonic frequency is in the blue light spectrum.

* * * * *